United States Patent [19]
Sharp

[11] 4,363,215
[45] Dec. 14, 1982

[54] H2S ABATEMENT PROCESS

[75] Inventor: Spencer G. Sharp, Fairfax, Calif.

[73] Assignee: Pacific Gas and Electric Company, San Francisco, Calif.

[21] Appl. No.: 230,263

[22] Filed: Jan. 30, 1981

[51] Int. Cl.³ .............................................. F03G 7/00
[52] U.S. Cl. .................................. 60/641.2; 423/224; 423/226; 423/561 R; 210/759; 210/763
[58] Field of Search ........... 423/224, 226, 232, 561 R; 210/758, 759, 761–763; 60/641.2, 641.3, 641.4, 641.5

[56] References Cited

U.S. PATENT DOCUMENTS

| | | | |
|---|---|---|---|
| 2,972,512 | 2/1961 | Guinot et al. | 423/226 |
| 3,097,926 | 7/1963 | Nicklin et al. | 423/573 |
| 3,226,320 | 12/1965 | Mevly | 210/763 |
| 4,009,251 | 2/1977 | Mevly | 423/226 |
| 4,218,431 | 8/1980 | Spevack | 423/561 |
| 4,224,151 | 9/1980 | Jost | 423/224 X |

OTHER PUBLICATIONS

Castranas, "The Use of Hydrogen Peroxide to Abate Hydrogen Sulfide in Geothermal Operations", Paper 7882, presented at the 1979 SPE of AIME International Symposium on Oilfield & Geothermal Chemistry, Houston, Texas, 1976.

"The Geothermal Resource", Petroleum Information Corporation, 1979, pp. 46∝49 & 100–103.

Allen et al, "Abatement of Hydrogen Sulfide Emissions from the Geysers Geothermal Power Plant", Second United Nations Symposium on the Development & Utilization of Geothermal Resources, 1975, pp. 313-315.

Primary Examiner—Earl C. Thomas
Attorney, Agent, or Firm—Owen, Wickersham & Erickson

[57] ABSTRACT

A process for the conversion of aqueous hydrogen sulfide, bisulfide ion, and sulfide ion in condensed geothermal steam to form less volatile and environmentally less objectionable sulfur compounds comprises reacting such steam components with hydrogen peroxide catalyzed by various iron or nickel compounds. The hydrogen peroxide and catalyst are added to steam condensate after it has been used and before it is returned to a cooling tower where it may be added to other cooling water in a geothermal steam power system. The conversion process prevents the buildup of harmful, contaminating sulfur compounds on system components in the liquid stream and also prevents the release of certain otherwise voltatile components to the atmosphere.

6 Claims, 7 Drawing Figures

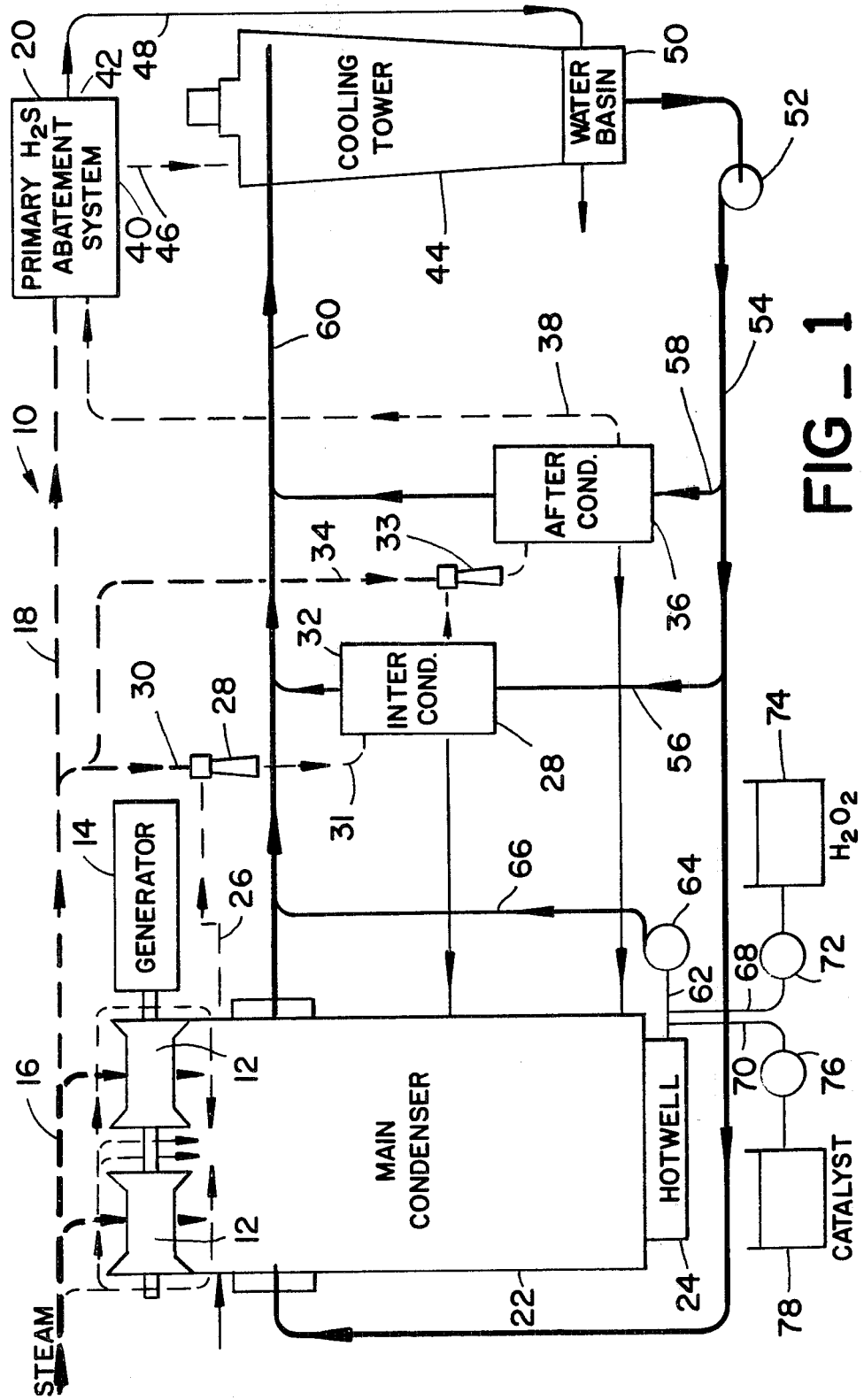
FIG_1

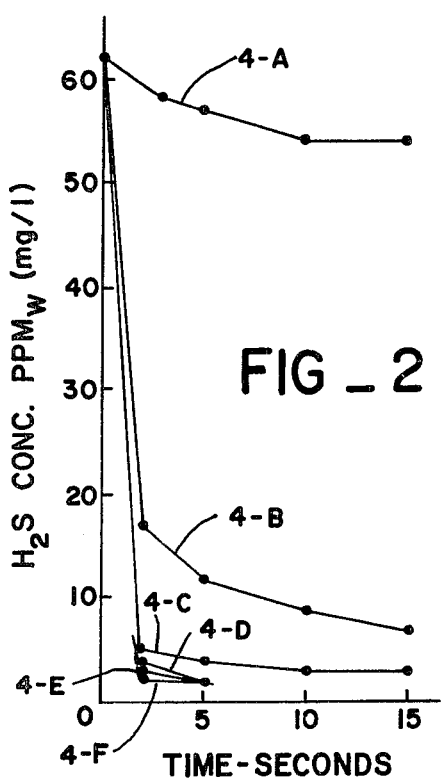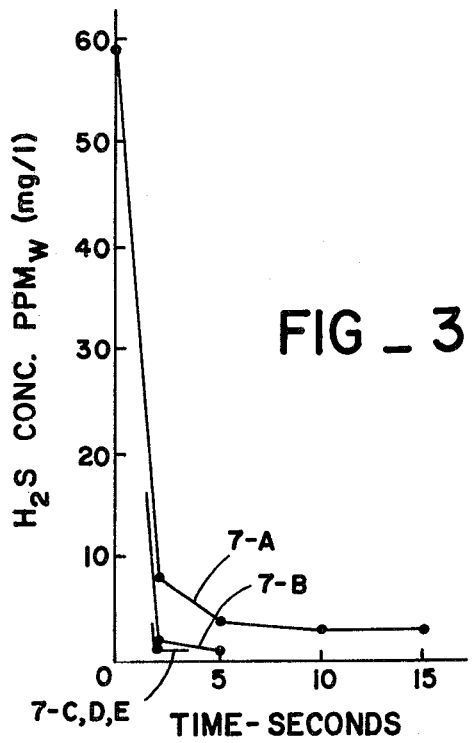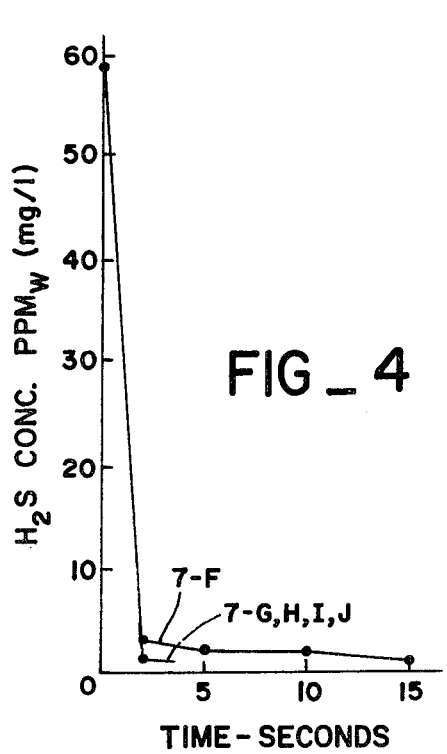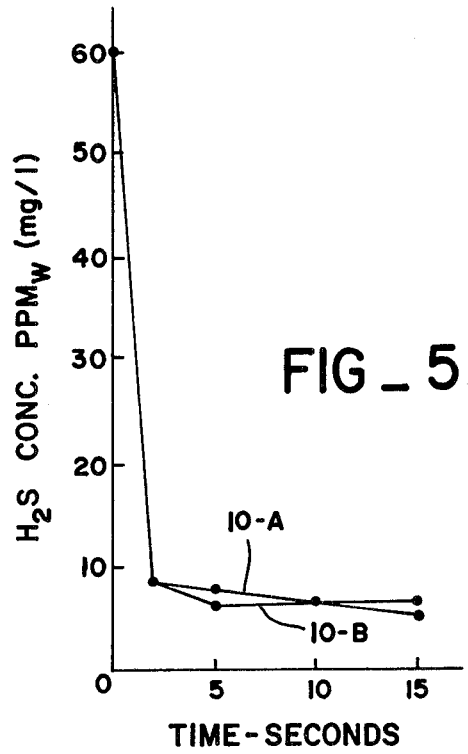

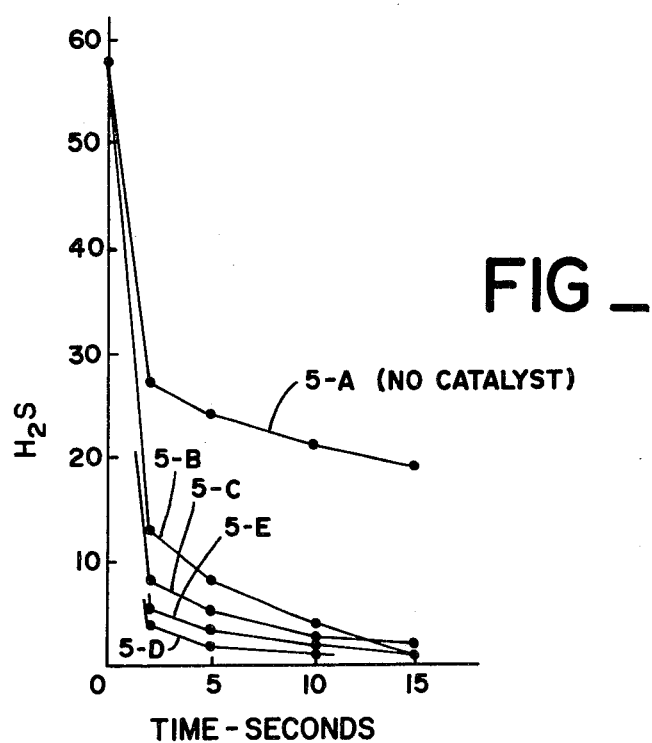
FIG_6
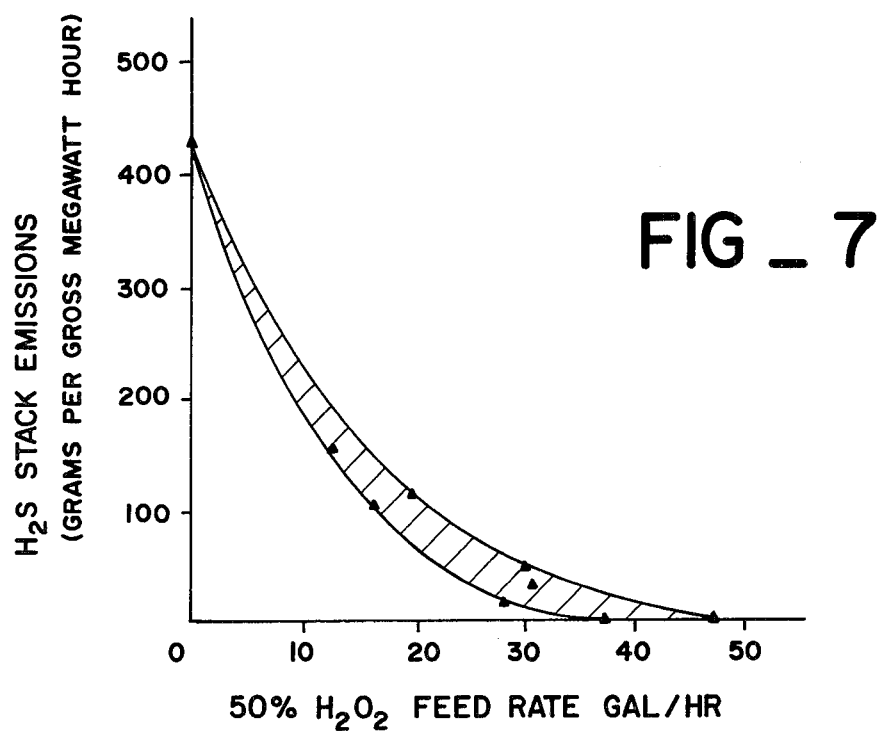
FIG_7

H2S ABATEMENT PROCESS

BACKGROUND OF THE INVENTION

This invention relates to a method for converting undesirable sulfur compounds in geothermal steam to less volatile and environmentally less objectionable compounds.

The development of geothermal power has been slowed due to the presence of such sulfur compounds as hydrogen sulfide, bisulfide ion and sulfide ion in the geothermal steam produced from drilled wells. When released to the atmosphere, hydrogen sulfide has an objectionable odor detectable in adjacent inhabited areas and is therefore considered to be generally environmentally undesirable or intolerable.

Various processes have been proposed for removing hydrogen sulfide from the steam after it is used and before noncondensed gases are vented to the atmosphere. For example, one such process which has been practiced on power plants using geothermal steam from wells in California, is known to those versed in the art as the "Stretford" process and is described in U.S. Pat. No. 3,097,926. Essentially, in this process, the noncondensable gas stream is treated with aqueous alkaline solution to remove hydrogen sulfide before being vented.

Although the problem of contaminating the atmosphere was relieved by the aforesaid process and other similar processes for removing hydrogen sulfide from the noncondensable gases, the initially condensed steam created a secondary abatement problem in that the aqueous hydrogen sulfide dissolved in the steam condensate was introduced into the circulating water and was ultimately outgassed in the cooling tower. Known treatment processes for discharging hydrogen sulfide converted it into solid residues consisting of insoluble metal sulfides, elemental sulfur, and to a lesser extent, soluble sulfur compounds such as thiosulfate ion and sulfate ion. These solid residues created severe operating problems within the production units of the steam utilization system by plugging process equipments, such as heat exchanger tubes, cooling tower nozzles, and drift eliminators.

It is therefore a general object of the present invention to solve this problem by providing a process and apparatus that converts the aqueous hydrogen sulfide in the steam condensate to compounds of lesser volatility without forming objectionable amounts of insoluble residues. That is to say, the objectionable sulfur compounds, including hydrogen sulfide, bisulfide and sulfide ions, are converted to compounds of such lesser volatility so that gases ultimately vented to the atmosphere meet environmental standards or requirements therefor, and the condensate or circulating water is substantially free of insoluble residues or substances derived from the starting sulfur compounds.

Another object of the invention is to provide a process for converting aqueous hydrogen sulfide from contaminated steam condensate that is relatively easy to carry out with a minimum of specialized apparatus or highly skilled labor and which is therefore relatively inexpensive.

BRIEF SUMMARY OF THE INVENTION

The process according to the principles of the invention is particularly adaptable to a geothermal steam power system wherein the raw contaminated steam from a geothermal well is first applied to a turbine that converts a portion of its energy to work, and from there to series connected main, inter and after condenser stages before being routed through the initial decontamination process (e.g., the aforementioned Stretford process). The contaminating aqueous hydrogen sulfide is primarily trapped in the main condenser which is directly adjacent the steam utilization device (e.g., turbine) and within this condenser is a heat exchanger. Thus, the contaminated liquid collected in the main condenser is drawn from it by a pump and furnished to the decontaminating apparatus of the present invention wherein the aqueous hydrogen sulfide and other unwanted sulfur compounds are converted to less volatile water-soluble compounds that will not foul heat exchangers, valves and other components of the system. The decontaminating apparatus provided is suitable for carrying out a process for introducing into the contaminated condensate between the main condenser and the aforesaid pump a quantity of hydrogen peroxide catalyzed by iron or nickel compounds, including organic iron compounds. The organic iron compounds comprise iron (II) (ferrous) ion compounded with or mixed with at least one of several organic compounds containing one or more functional groups as carboxylic acid, hydroxy, or nitrilo, such compounds being known as chelates. The conversion process is accomplished for flow rates up to 2,000,000 lbs/hr and with an efficiency of greater than 95%, so that the decontaminated condensate is essentially free of aqueous hydrogen sulfide, corrosive solids and insoluble sulfur compounds and can be returned to the circulating water system and then on to the cooling tower. In the process and system of this invention, the contaminating sulfur compounds as described are reduced in amount to an environmentally acceptable level, if present at all, in the exhaust gases vented to the atmosphere.

Other objects, advantages and features of the invention will become apparent from the following detailed description presented in conjunction with the accompanying drawing.

BRIEF DESCRIPTION OF THE DRAWING

FIG. 1 is a schematic representation of a steam power system utilizing an abatement system according to the present invention;

FIGS. 2-6 are graph representations of bench test data using the method according to the invention; and FIG. 7 is a graph of field test data showing emissions of $H_2S$ related to $H_2O_2$ feed rate.

DETAILED DESCRIPTION

Although it is known that steam, such as geothermal steam, and its condensate containing dissolved or soluble sulfur components can be used for various purposes, the present invention will be described with respect to the treatment of geothermal steam, and more specifically, exhaust steam from a work zone. Thus, the invention is particularly applicable to the treatment of steam condensate after it has been exhausted from turbines connected to an electric generator. In FIG. 1 is shown a typical power system 10 for utilizing geothermal steam to drive a pair of turbines 12 connected to a generator unit 14 and having both a primary and a secondary hydrogen sulfide abatement apparatus.

In the power generating system shown, geothermal steam is supplied through a main steam line 16 to the turbines and by an auxiliary line 18 to the primary abatement apparatus 20 which will be referred to later. The exhausted steam from the turbines is furnished to a main condenser 22 having internal heat exchanger components which may be of conventional design and are not shown in detail. Within the main condenser the steam is cooled and condensed to its liquid state and is collected in a hotwell 24 at the lower side of the condenser. At this point the steam condensate contains undesirable compounds in solution which must be removed in order to prevent their release to the atmosphere.

Within the exhausted steam in the main condenser are certain volatile gases which are tapped off through an outlet line 26. This latter line is connected to a first stage gas ejector 28 whose inlet is connected by a conduit 30 to the auxiliary steam line 18 and whose outlet is connected by a conduit 31 to an inter condenser 32. A second stage gas ejector 33 having an inlet connected by a conduit 34 to the auxiliary steam line 18, has an outlet connected to an after condenser 36. This latter ejector also receives overflow gas from the inter condenser so that it can be further condensed in the after condenser. Gases that are still not condensed in the after condensers 36 contain objectionable gaseous sulfur compound including hydrogen sulfide and are sent via a conduit 38 to the primary abatement system.

The primary abatement system 20 comprises a unit that removes hydrogen sulfide and other sulfur compounds from the mixed steam and gas furnished to it using a process such as disclosed in U.S. Pat. No. 3,097,926. This primary abatement system has two outlets 40 and 42 connected directly to a cooling tower 44. One outlet via a line 46 furnishes uncondensed gases to the cooling tower and another outlet via a conduit 48 provides water from the condensed steam to a water basin 50 at the lower end of the cooling tower.

Water collected by the cooling tower basin 50 is furnished therefrom to a circulating water pump 52 which supplies it under pressure through a main water conduit 54 to the main condenser 22 and also to the inter and after condensers 32 and 36 via lines 56 and 58. From the various condensers the cooling water is recirculated back to the cooling tower via a return conduit 60. A major portion of the cooling water pumped from the basin of the cooling tower is furnished to the main condenser to cool and condense the steam used in the turbines. As this cooling water leaves the main condenser it receives water condensed from the working steam that is collected in the hotwell section 24 of the condenser. It is this condensed steam that initially contains the contaminants which are removed by the apparatus and method of the present invention before it is combined with the cooling water that is returned to the cooling tower.

The condensed steam collected in the hotwell section of the condenser 22 flows through a short pipe 62 to a condensate pump 64 whose outlet supplies the treated condensate water to the cooling water return line 60 via a conduit 66.

The treatment apparatus for the steam condensate according to the invention comprises a pair of conduits 68 and 70 connected directly to the short pipe 62 between the condenser hotwell and the condensate pump. The first of these conduits extends from a metering pump 72 whose input is connected to a supply tank 74 for an oxidizer material and the second conduit 70 extends from another metering pump 76 connected to a supply tank 78 for a catalyst material. As will be shown from the following, the introduction of the oxidizer and catalyst materials into the condensed steam as water from the condenser serves to oxidize the normally contaminating sulfur components. These undesirable sulfur components in the condensed steam include hydrogen sulfide, bisulfide ion, or sulfide ion, or all or any combinations of these components. In accordance with the present invention they are converted in the flowing stream of condensate in a continuous manner as the condensate admixture passes through the return conduit to the cooling tower. The reaction time of the oxidizer and catalyst with the components in the condensate is relatively rapid and can be as low as 14 seconds.

In carrying out the process according to the invention, there is introduced into the condensate steam as it leaves the primary condenser an amount of hydrogen peroxide, $H_2O_2$, sufficient to oxidize the dissolved sulfur components to a water soluble state which is environmentally harmless, and a catalytic amount of a chelate of iron (II), nickel, or of nickel sulfate, $NiSO_4$. If desired, mixtures of such chelates in any desired ratio to each other can be employed. Sufficient hydrogen peroxide in aqueous solution is added to reduce the amount of sulfur compounds as described to not over the environmentally tolerable amount thereof in the gases vented to the atmosphere.

It has been found that from 1 to 1.5 mole of hydrogen peroxide per mole $H_2S$ or total sulfur component in the condensate is advantageous in effecting the desired oxidation without producing a solid product of the reaction. Hydrogen peroxide is advantageous because it reacts most rapidly and effects good oxidation in all of the tests run.

With respect to the catalyst, there can be employed the chelate of iron II as described which is water soluble and which contains a carboxylic acid, hydroxy or nitrilo functional group. Iron (II) chelate $FeSO_4$. chelate, has been found to give very good results. Thus, there can be employed iron (II) hydroxy acetic acid chelate (Fe/HAA) which appears to give optimum results, $FeSO_4$, nickel sulfate ($NiSO_4$), iron (II) ethylenediaminetetraacetic acid (iron (II) EDTA), or iron (II) nitrilotriacetic acid. It has also been noted that the addition of $H_2O_2$ and FE/HAA effects drastic reduction in the bacteria count in the circulating water.

The catalyst as described above is suitably added in an amount of from 0.5 to 1.0 parts per million expressed as free metal.

In a first phase test program for the secondary abatement process of the present invention, bench-scale tests of several catalyst+oxidizer combinations were made. The catalysts included iron (II) sulfate, chelated iron compounds, and nickel sulfate. The oxidizers included hydrogen peroxide and atmospheric oxygen dissolved ino the circulating waters in the cooling tower. The test results are summarized below. Although the test data are given with respect to $H_2S$, it will be understood that the other volatile or volatilizable sulfur components mentioned above, if present, are also reduced in amount to provide environmentally unobjectionable gases as vented to the atmosphere. The catalysts are formed by mixing together in solution the compounds noted, e.g., $FeSO_4$ and hydroxy acetic acid, etc.

These tests were designed to determine if there is a high probability that one or more catalyst plus oxidizer combinations could successfully treat the dissolved hydrogen sulfide in the condensate of steam from a geothermal well to meet emissions limits of 100 gm $H_2S$/GMW/hr. The second objective of the tests was to investigate the likelihood of forming solids with the processes. Such solids, if formed, could cause operating problems with the surface condenser units.

HYDROGEN PEROXIDE+CATALYST EXPERIMENTS

The experimental conditions used during the $H_2O_2$+catalyst tests are summarized in Table 1, test series 1, 2, 3, 4, 5, 7, 8, 9, and 10. The results of these tests are tabulated in Table 2 and are shown graphically in FIGS. 2 through 7. Tests 1, 2, and 3, were preliminary tests which were not fully evaluated since the power generating unit was not operating at full load and cooling water was entering the condenser via the start-up valve. This condition lowered the concentration of $H_2S$ in the condensate stream while adding dissolved oxygen from the circulating water. In the tests herein, water is the solvent.

Test series 4 was used to select an initial hydrogen peroxide concentration to be used in the subsequent tests to evaluate the relative effectiveness of the different catalysts. All of the remaining tests used an initial hydrogen sulfide concentration of 120 pp. This closely approximates a 2:1 $H_2O_2$ to $H_2S$ mole ratio.

Test series 5 evaluated two chelated iron compounds supplied by the Dow Chemical Company. The first of these compounds, "Versenol Ag 5% Fe", is commercially available; the second, "XP73021.00" is an experimental compound and is not presently manufactured in bulk.

Test series 7 evaluated several easily prepared chelated iron compounds. In each case, two grams of chelating agent were added to 100 ml of 0.07% iron (II) sulfate solution. No attempt was made to optimize the ratio of chelating agent to iron.

Test series 8 investigated whether or not there was a change in solution pH after the addition of iron (II) sulfate and hydrogen peroxide. No significant change in pH occurred.

Test series 10 evaluated nickel (II) sulfate and "Cataban", a chelated iron compound manufactured by Rhodia Corporation. The exact concentration of iron in Cataban is not known.

In order to meet the 100 gm $H_2S$/GMW/hr emissions limit, the concentration of $H_2S$ dissolved in the condensate must be 8 ppm (mg/1) or less. As can be seen in FIGS. 2-5, all of the $H_2O_2$+catalyst combinations tested reduced the $H_2S$ concentration to less than that required to meet the Northern Sonoma County Air Pollution Control District emissions limit within the 14 second available reaction time.

From the tests described, it was concluded that hydrogen peroxide is effective in reducing hydrogen sulfide dissolved in the condensate with any of the catalysts tried during the bench-scale tests. However, the following catalysts were found to be particularly effective and were recommended for further Phase II short duration (10-30 hr.) tests.

1. $H_2O_2$+$FeSO_4$
2. $H_2O_2$+$FeSO_4$. hydroxy-acetic acid chelate

The only catalyst that appears to reduce the hydrogen sulfide concentrations in the condensate with dissolved oxygen as the oxidant is $FeSO_4$. hydroxy-acetic acid. Therefore, this would be the only recommended catalyst to use with dissolved oxygen.

FIGS. 2-6 derived from the test data indicate that the concentration of hydrogen sulfide in the steam condensate can be rapidly decreased using the additives of the test systems. In each figure, each solid line interconnecting data points represents the designated test run.

TABLE 1

SOLIDS FORMATION IN TESTS ON FIRST STEAM CONDENSATE

| Test No. | Initial $H_2S$ ppm in Condensate | $H_2O_2$ ppm in Condensate | Catalyst Type | Catalyst Conc. ppm as Free Metal | Visible Solid Formation | Notes |
|---|---|---|---|---|---|---|
| 1-A | 46 | 300 | None | 0.0 | No | (1) |
| 1-B | 46 | 300 | $FeSO_4$ | 1.4 | No | (2) |
| 1-C | 46 | 300 | " | 2.8 | No | (2) |
| 2-A | 46 | 240 | $FeSO_4$ | 1.4 | No | (2) |
| 2-B | 46 | 240 | " | 2.8 | No | (2) |
| 2-C | 46 | 240 | None | 0.0 | No | (1) (3) |
| 3-A | 46 | 0 | $FeSO_4$ | 1.4 | Yes | (4) |
| 3-B | 46 | 60 | " | 1.4 | No | (2) |
| 4-A | 62 | 0 | $FeSO_4$ | 1.4 | Yes | (4) |
| 4-B | 62 | 60 | " | 1.4 | | (4) |
| 4-C | 62 | 120 | " | 1.4 | No | (2) |
| 4-D | 62 | 180 | " | 1.4 | No | (2) |
| 4-E | 62 | 240 | " | 1.4 | No | (2) |
| 4-F | 62 | 300 | " | 1.4 | No | (2) |
| 5-A | 58 | 120 | None | 0.0 | No | (1) |
| 5-B | 58 | 120 | Versenol AG 5% Fe | 1.0 | No | (5) (6) |
| 5-C | 58 | 120 | Versenol AG 5% Fe | 0.5 | No | (5) (6) |
| 5-D | 58 | 120 | XP73021.00 | 1.0 | No | (5) (7) |
| 5-E | 58 | 120 | " | 0.3 | No | (5) (7) |

"Versenol A 65% Fe" is ferrous iron chelated with N—hydroxyethyl-ethylene diamine triacetic acid sodium salt. "XP73201.00" is also an organic iron chelated compound.

| 7-A | 59 | 120 | $FeSO_4$ | 1.4 | No | (2) |
| 7-B | 59 | 120 | $FeSO_4$ + HAA | 1.4 | No | (2) |
| 7-C | 59 | 120 | $FeSO_4$ + ORSANS | 1.4 | No | (2) |
| 7-D | 59 | 120 | $FeSO_4$ + NTA | 1.4 | No | (5) (8) |
| 7-E | 59 | 120 | $FeSO_4$ + EDTA | 1.4 | No | (5) |
| 7-F | 59 | 120 | $FeSO_4$ | 2.8 | No | (2) |
| 7-G | 59 | 120 | $FeSO_4$ + HAA | 2.8 | No | (2) |
| 7-H | 59 | 120 | $FeSO_4$ + ORSANS | 2.8 | No | (2) |
| 7-I | 59 | 120 | $FeSO_4$ + NTA | 2.8 | No | (5) (8) |
| 7-J | 59 | 120 | $FeSO_4$ + EDTA | 2.8 | Yes | (2) (9) |
| 8-A | 59 | 120 | $FeSO_4$ | 1.4 | No | (10) |
| 10-A | 60 | 120 | $NiSO_4$ | 1.4 | No | (11) |
| 10-B | 60 | 120 | Cataban | 5 as Cataban | No | (5) |

"ORSANS" is sodium lignin sulfonate. "Cataban" is a chelated iron compound.

NOTES: (TABLE 1)
(1) Solution turned yellow after addition of $H_2O_2$ cleared after several minutes.
(2) Solution turned black to green-black after addition of $FeSO_4$ and $H_2O_2$. Turned to yellow after several seconds and remained yellow.
(3) No visible precipitate with addition of HCl. White precipitate with addition of $BaCl_2$ indicating presence of sulfate.
(4) Black precipitates formed - probably FeS.
(5) Solution turned reddish after addition of catalyst and $H_2O_2$. Turned yellow after several seconds.
(6) Versenol AG 5% Fe is a commercial product of the Dow Chemical Company.
(7) XP73021.00 is an experimental product of the Dow Chemical Company. It is not commercially produced at this time.
(8) Solution turned clear in five minutes.
(9) White precipitate formed - probably S°.
(10) This experiment followed pH vs. time rather than $H_2S$ concentration - pH change was less than 0.1 pH unit.

TABLE 2

REDUCTION IN H₂S IN TESTS OF TABLE 1

| Test No. | Temp °F. | $H_2S$ Conc. T = 0 sec | T = 2 sec | T = 5 sec | T = 10 sec | T = 15 sec | Calibration Curve |
|---|---|---|---|---|---|---|---|
| 4-A | 114 | 62 | 58 (3 sec) | 57 | 54 | 54 | 6/28/79 |
| 4-B | 112 | 62 | 17 | 12 | 9 | 7 | " |
| 4-C | 112 | 62 | 5 | 4 | 3 | 3 | " |
| 4-D | 112 | 62 | 4 | 2 | — | — | " |
| 4-E | 114 | 62 | 3 | 2 | — | — | " |
| 4-F | 112 | 62 | 2 | 2 | — | — | " |
| 5-A | 116 | 58 | 27 | 24 | 21 | 19 | 7/21/79/A |
| 5-B | 115 | 58 | 13 | 8 | 4 | 1 | " |
| 5-C | 115 | 58 | 8 | 5 | 3 | 2 | " |
| 5-D | 116 | 58 | 4 | 2 | 1 | — | " |
| 5-E | 114 | 58 | 5 | 3 | 2 | 1 | " |
| 7-A | 117 | 59 | 8 | 4 | 3 | 3 | 7/22/79/A |
| 7-B | 118 | 59 | 2 | 1 | — | — | " |
| 7-C | 118 | 59 | 1 | — | — | — | " |
| 7-D | 118 | 59 | 1 | 1 | 1 | 1 | " |
| 7-E | 118 | 59 | 1 | 1 | — | — | " |
| 7-F | 118 | 59 | 3 | 2 | 2 | 1 | " |
| 7-G | 118 | 59 | 1 | — | — | — | " |
| 7-H | 118 | 59 | 1 | — | — | — | " |
| 7-I | 118 | 59 | 1 | — | — | — | " |
| 7-J | 117 | 59 | 1 | — | — | — | " |
| 8-A | Not Rec. | pH ≃ 9 | ΔpH < 0.1 | ΔpH < 0.1 | ΔpH < 0.1 | ΔpH < 0.1 | None |
| 10-A | 119 | 60 | 9 | 8 | 7 | 7 | 7/24/79/A |
| 10-B | 118 | 60 | 9 | 7 | 7 | 6 | " |

The procedure used in the bench tests may be described as follows:

Fresh condensate (500 ml) from an actual operating geothermal power plant condensate sample tap was placed in a beaker containing a magnetic stirring bar. Electrodes (silver/silver sulfide and double junction reference) connected to a millivolt meter and strip-chart recorder were then placed in the condensate. At time 0 iron (II) sulfate and hydrogen peroxide were added to the reaction beaker from small beakers. The progress of the hydrogen sulfide oxidation reaction was then followed with the strip-chart recorder.

Calibration procedures in the above tests included first (Catalyst+H₂O₂ Tests) filling the reaction beaker with 500 ml of deionized water and then heating it to the normal condensate temperature (approximately 120° F.). Next, a condensate sample was obtained and its H₂S concentration determined. Fresh condensate was then added to the beaker in 2% increments so that the beaker contained first 2% condensate, then 4% ... up to a maximum of 10%. The millivolt readings were determined at each addition. Additional millivolt readings were taken with 100% condensate. The log of H₂S concentration vs. millivolt reading was then plotted and the resulting graph was used to determine the H₂S concentration from the strip chart recordings made during the H₂S oxidation reactions.

Subsequent to the previously described bench tests, field tests of the secondary abatement method according to the present invention were performed at a geothermal power plant. The previous short duration tests, for a power system as shown in FIG. 1, indicated that the 1980 hydrogen sulfide emissions standard of 100 grams hydrogen sulfide/gross MwHr could be achieved by injecting hydrogen peroxide and catalyst solution of iron (II) sulfate/hydroxyacetic acid (Fe/HAA) into the main condenser condensate line. The field test consisted of five days of continuous chemical feed into condensate water from the main condenser while hydrogen sulfide emissions were monitored around the clock as well as the condensate and circulating water for the production of suspended solids.

During the test procedures, the plant main steam was analyzed approximately every six hours for incoming hydrogen sulfide concentrations. The desired test parameters were a constant Fe/HAA feed rate at several different hydrogen peroxide feed rates. Both Fe/HAA and peroxide feed rates were checked periodically and adjusted as needed. The peroxide feed rate was measured with a metering tank and the Fe/HAA feed rate was measured with a rotameter. Cooling tower stack emissions were usually measured every hour immediately after a peroxide feed rate change, otherwise, every two hours. The stack H₂S concentration measurements were done by the probe-in-stack procedure. The total emissions were then calculated using previously calibrated velocity measurements and suspended solids analyses were made during the test period. Samples, for solids analysis, were taken at the main condenser condensate line, cooling tower blowdown stream, and the condenser cooling water intake line.

The results of the field tests indicated show that injection of aqueous hydrogen peroxide and Fe/HAA chelate reduced emissions to meet the 1980 and the proposed 1990 hydrogen sulfide emissions standards. As indicated by the data illustrated in FIG. 7, 50 percent peroxide was fed at a flow rate of about 20 gal/hr (or about 3 lbs of 50 percent hydrogen peroxide per pound of hydrogen sulfide, 1.5:1 mole ratio) in the condensate to meet the 100 gm/gross MwHr limit. The proposed 1990 hydrogen sulfide emissions standard of 50 gm/gross MwHr was met by a 50% peroxide feed of about 30 gph (or 5 lbs of 50 percent peroxide per pound of hydrogen sulfide, 2.5:1 mole ratio) in the condensate.

With regard to cooling tower exhaust stack emissions over the complete test period using 50% hydrogen peroxide feed rates during the same period, such emissions decreased rapidly upon increased injection of peroxide. This rapid response time indicates that the reaction rate is fast and that the reaction occurs between the condenser and the cooling tower. When the peroxide feed was shut off, the stack emissions rapidly increased, indicating that very little residual peroxide is present in the circulating water. Peroxide feed rates greater than 36 gph reduced stack emissions to below measurable concentrations.

In the above description and in the claims, values are given by weight or in moles unless otherwise indicated. Whether or not the above theory of operation of the process of this invention is correct, the invention described herein eliminates or substantially reduces the emission of environmentally objectionable sulfur-containing gases and substantially prevents or reduces buildup of corrosive solids within the geothermal steam recovery and utilization system, derived from volatile sulfur compounds in the steam.

I claim:

1. In a process for utilizing geothermal steam from drilled wells producing waste gases vented to the atmosphere containing not over environmentally acceptable amounts of volatile sulfur contaminants as normally contained in said steam, a method for converting said volatile sulfur contaminants into water-soluble, less volatile sulfur compounds which are environmentally less objectionable and are substantially all retained in recirculated steam condensate, the steps which consist essentially of:
   (a) introducing geothermal steam to a work zone and utilizing energy therein,
   (b) withdrawing a stream of exhaust steam from said work zone to a first condensing zone to form a condensate and residual gases,
   (c) separately withdrawing said gases to a series of further condensing zones to form further condensates and residual gases,
   (d) recycling said further condensates to said first condensing zone and mingling with said first-mentioned condensate,
   (e) continuously admixing with said mingled condensates from 1 mole to 2.5 moles hydrogen peroxide per mole of volatile sulfur contaminant expressed as hydrogen sulfide, and
   (f) as catalyst from 0.5 to 1.0 parts per million of ferrous sulfate hydroxyacetic acid,
   (g) to provide gases vented to the atmosphere containing volatile sulfur contaminants in not over environmentally acceptable amounts and a circulating condensate substantially free of corrosive solids.

2. In a system for utilizing geothermal steam from drilled wells, wherein said steam is fed to a work zone where part of the energy of said steam is utilized and exhaust steam therefrom, containing soluble sulfur contaminants including hydrogen sulfide, bisulfide ion and sulfide ion, is condensed in a condensing zone, a continuous process for converting said contaminants to water-soluble, less volatile compounds, which consists essentially of withdrawing a stream of said condensed steam from said condensing zone, continuously admixing therewith as oxidizing agent hydrogen peroxide and a catalytic compound chosen from the group consisting of ferrous sulfate, nickel sulfate, and ferrous organic chelate compound, said chelate compound containing a carboxylic, hydroxy, or nitrilo group, to form a flowing admixture, and reacting said flowing admixture to convert said soluble sulfur contaminants into less volatile water-soluble compounds, and to provide condensed steam essentially free of aqueous hydrogen sulfide and insoluble sulfur compounds.

3. In a process for utilizing geothermal steam from drilled wells, wherein said steam is fed to a work zone where part of the energy of said steam is utilized and exhaust steam therefrom, containing water-soluble sulfur contaminants including hydrogen sulfide, bisulfide ion and sulfide ion, is condensed in a condensing zone to form a liquid condensate and residual gases, a method for converting said contaminants in said condensate to water-soluble, less volatile compounds which are environmentally less objectionable, which consists essentially of withdrawing a stream of said condensate from said condensing zone to form a condensate, continuously admixing hydrogen peroxide with said condensate in an amount sufficient to oxidize said contaminants, and a catalyst consisting of ferrous sulfate hydroxyacetic acid adapted to promote oxidation of said sulfur contaminants by said peroxide, to provide gases vented from the process containing volatile sulfur compounds in not over environmentally acceptable amount and a circulating condensate substantially free of corrosive solids.

4. In a process for utilizing geothermal steam from drilled wells, wherein said steam is fed to a work zone where part of the energy of said steam is utilized and exhaust steam therefrom, containing water-soluble sulfur contaminants including hydrogen sulfide, bisulfide ion and sulfide ion, is condensed in a condensing zone to form a liquid condensate and residual gases, a method for converting said contaminants in said condensate to water-soluble, less volatile compounds which are environmentally less objectionable, which consists essentially of withdrawing a stream of said condensate from said condensing zone to form a condensate, continuously admixing hydrogen peroxide with said condensate in an amount sufficient to oxidize said contaminants, and a catalyst consisting of ferrous sulfate ethylenediaminetetraacetic acid adapted to promote oxidation of said sulfur contaminants by said peroxide, to provide gases vented from the process containing volatile sulfur compounds in not over environmentally acceptable amount and a circulating condensate substantially free of corrosive solids.

5. In a process for utilizing geothermal steam from drilled wells, wherein said steam is fed to a work zone where part of the energy of said steam is utilized and exhaust steam therefrom, containing water-soluble sulfur contaminants including hydrogen sulfide, bisulfide ion and sulfide ion, is condensed in a condensing zone to form a liquid condensate and residual gases, a method for converting said contaminants in said condensate to water-soluble, less volatile compounds which are environmentally less objectionable, which consists essentially of withdrawing a stream of said condensate from said condensing zone to form a condensate, continuously admixing hydrogen peroxide with said condensate in an amount sufficient to oxidize said contaminants, and a catalyst consisting of ferrous sulfate nitrilotriacetic acid adapted to promote oxidation of said sulfur contaminants by said peroxide, to provide gases vented from the process containing volatile sulfur compounds in not over environmentally acceptable amount and a circulating condensate substantially free of corrosive solids.

6. In a process for utilizing geothermal steam from drilled wells while producing waste gases vented to the atmosphere containing not over environmentally acceptable amounts of volatile sulfur contaminants as normally contained in said steam, a method for converting said volatile sulfur contaminants into water-soluble, less volatile sulfur compounds which are environmentally less objectionable and are substantially all retained in recirculated steam condensate, the steps which comprise:

(a) introducing geothermal steam to a work zone and utilizing energy therein;

(b) withdrawing a stream of exhaust steam from said work zone to a first condensing zone to form a condensate and residual gases;

(c) separately withdrawing said gases to a series of further condensing zones to form further condensates and residual gases;

(d) recycling said further condensates to said first condensing zone and mingling with said first-mentioned condensate;

(e) continuously admixing with such mingled condensates sufficient aqueous hydrogen peroxide to oxidize said volatile contaminants therein to four said less objectionable sulfur compounds, and (f) using a catalyst consisting of ferrous sulfate hydroxyacetic acid to promote oxidation of said sulfur contaminants by said peroxide.

(g) to provide gases vented from the process containing volatile sulfur contaminants in not over environmentally acceptable amounts and a circulating condensate substantially free of corrosive solids.

* * * * *